May 8, 1956  W. L. PARKER  2,744,533
HYDRAULIC FUSE
Filed April 23, 1951
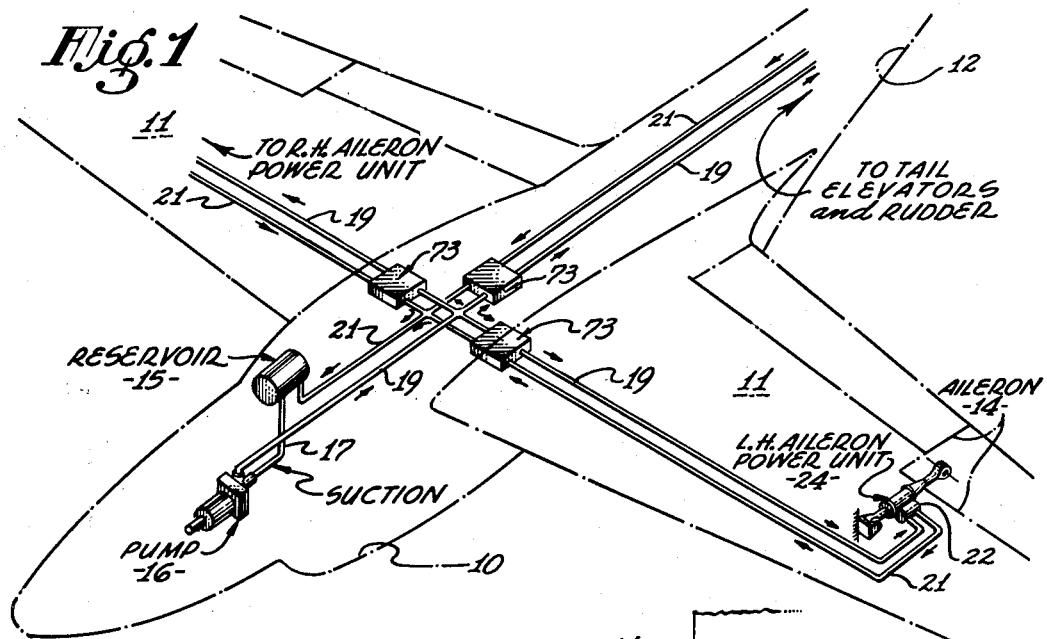
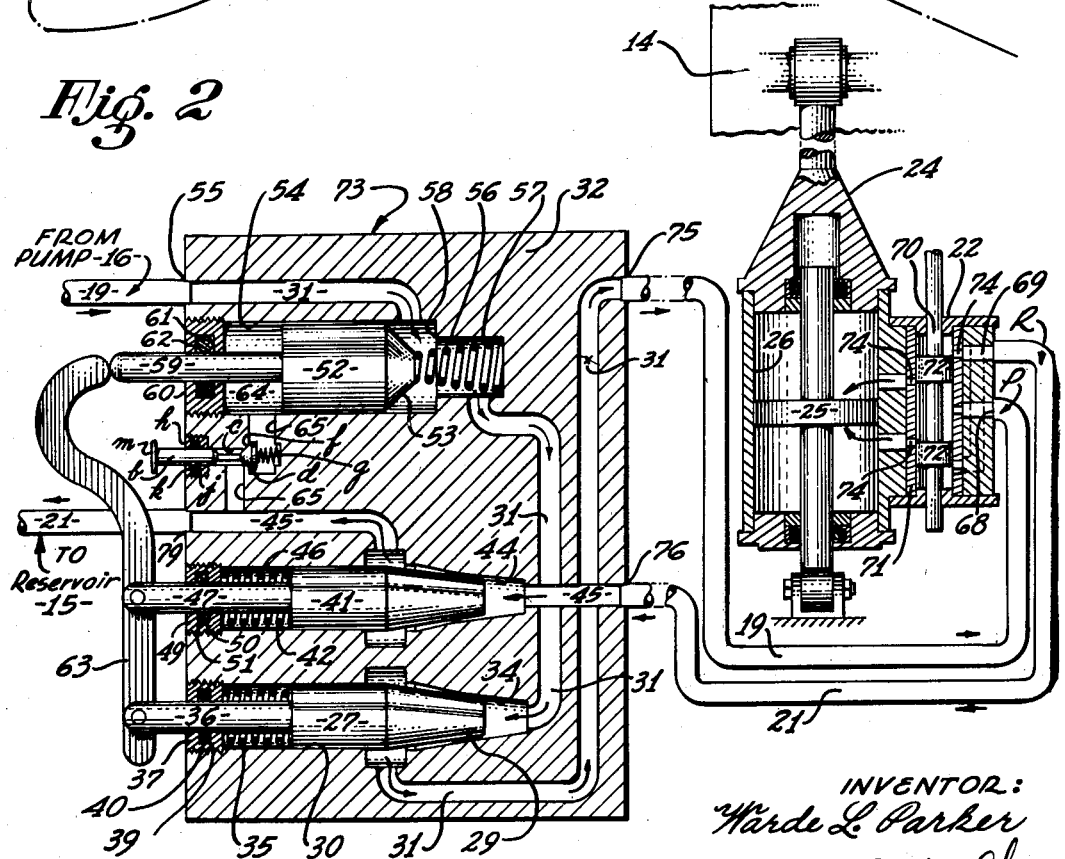
INVENTOR:
Warde L. Parker
By Herbert E. Metcalf
HIS PATENT ATTORNEY United States Patent Office 2,744,533
Patented May 8, 1956

2,744,533

HYDRAULIC FUSE

Warde L. Parker, Los Angeles, Calif., assignor to Northrop Aircraft, Inc., Hawthorne, Calif., a corporation of California Application April 23, 1951, Serial No. 222,437

8 Claims. (Cl. 137—87)

This invention relates to hydraulic fuses, and more particularly, to a hydraulic fuse which is especially suited for use in neutral leakage type hydraulic full powered control systems in aircraft.

In fighter aircraft, such as the Northrop F-89 U. S. A. F. Scorpion for example, hydraulic pressure and return lines running to the power control units, some of which are located in the outer extremities of the wings and tail, are vulnerable to enemy gunfire. It is therefore expedient that means be provided for maintaining undamaged portions of the hydraulic system operative if other portions are shot away or damaged. It is even more desirable to provide automatic means for shutting off and isolating that portion of the hydraulic system wherein one or both lines to a power control fail.

The F-89, in particular, is equipped with irreversible full powered hydraulic controls as claimed in U. S. application, Serial No. 23,567, filed April 27, 1948, by Feeney, now abandoned, wherein neutral leakage type servocontrol valves are used.

It is an object of this invention to provide a hydraulic fuse which can be easily installed at any point in a hydraulic system between a hydraulic reservoir and a control unit, to automatically shut off any portion of the system wherein a hydraulic pressure or return line, or both, are ruptured or damaged; in order that the balance of the system may remain operable.

It is another object of this invention to provide a hydraulic fuse of compact construction, economical and relatively simple to manufacture, which will operate reliably within a temperature range of from —65° F. to +160° F. and which will be substantially unaffected by normal temperature variations.

It is a further object of this invention to provide a hydraulic fuse, the efficiency of which will be substantially unaffected by variations in hydraulic fluid density or viscosity, normal surge conditions, and ordinary pressure variations.

It is a still further object of this invention to provide a hydraulic fuse which can be substantially independent of an energy source outside of the hydraulic circuit, which can operate upon the basis either of flow rate through the system or flow volume therethrough.

Briefly, in one preferred form, the invention employs a pair of flow measuring valves positioned in the hydraulic pressure and return lines, respectively intermediate the hydraulic power source and a control unit. These valves are connected to actuate a shut-off valve in the pressure line upon the cessation of flow in either line. A resetting means for re-opening the shut-off valve from a closed position to resume operation of the respective system may also be used.

The invention will be more clearly understood by referring to the accompanying drawings wherein:

Figure 1 is a somewhat schematic view in perspective of an aircraft hydraulic control system.

Figure 2 is a diagrammatic schematic view in longitudinal section showing the internal construction of one preferred form of the present invention connected to a servocontrol valve and hydraulic motor.

Referring first to Figure 1, an aircraft 10 is shown wherein hydraulic fluid under pressure is supplied to power units located in the outer extremities of the wings 11 and tail 12 to operate certain surface control units; the left wing aileron 14 is shown for example.

Hydraulic fluid is transferred from a hydraulic reservoir 15 by an engine driven pump 16 through a suction line 17 into a pressure line 19, which supplies the fluid under a pressure force running as high as 3,000 p. s. i. in some systems, to the respective control units. The fluid is returned to the reservoir 15 through return lines 21. In short, all fluid supplied through the system pressure line 19 normally returns to the reservoir 15 through the return line 21.

The particular system described herein utilizes an irreversible neutral leakage servocontrol valve 22 of the general type described, shown, and claimed in U. S. application Serial No. 123,375, filed October 25, 1949, now U. S. Patent No. 2,612,872, one type of which is best shown in Figure 2, to actuate the surface control motor 24. In the present example, a neutral leakage exists to both sides of the piston 25 in the motor cylinder 26 during substantially all operating conditions to preload the motor 24 by balanced hydraulic forces locking the motor 24 and connected control surface 14 in any desired position against normal airloads, as will be described below.

It is therefore apparent that in the neutral leakage type system, the fluid under pressure is in a somewhat continuous state of flow in both the pressure and return lines during substantially all operating conditions.

Based on the continuous flow state of the fluid in the lines, the present invention, in one form as shown in Figure 2, employs a cylindrical valve poppet 27 having a somewhat tapered end 29, slidably retained within a lapped cylindrical bore 30 which transversely intersects a pressure passage 31 in a valve casing 32. The poppet 27 is balanced within the bore 30 with the tapered end 29 thereof positioned directly in the flow path through the casing pressure passage 31 which has a tapered opening 34 adapted to seat the tapered end 29 of the poppet 27. A preloaded compression spring 35 abuts the other end of the poppet 27 to oppose the flow force exerted upon the tapered end 29 thereof. An actuating rod 36 extends axially from the poppet 27 through a threaded casing plug 37, which also retains the spring 35, to the exterior of the casing 32. A ring seal 39 is provided in an annular internal groove 40 in the casing plug 37 to prevent external leakage.

A second valve poppet 41, identical to the first, is balanced in the tapered opening 44 of a casing return passage 45 by a preloaded spring 42, and is slidably positioned in a lapped cylindrical bore 46 which intersects the return passage 45. The second bore 46 is positioned parallel of the first bore 35 and is dimensionally equal thereto. The second poppet 41, as with the first, abuts the preloaded spring 42 at one end thereof and is provided with an actuating rod 47 which extends axially from the poppet 41, through a threaded casing plug 49 to the exterior of the casing 32 for approximately the same distance as the actuating rod 36 of the first poppet 27. A ring seal 50 is retained within an internal groove 51 in the casing plug 49 to prevent leakage around the rod 47.

A shut-off poppet 52 of substantially cylindrical contour and having a tapered end 53 is slidably retained within a lapped cylindrical bore 54, which transversely intersects the casing pressure passage 31 near the casing pressure passage inlet 55. A clearance on the order of .005 on the diameter is provided between the poppet 52 and the wall of the bore 54, the purpose of which will be explained later. The poppet 52 is positioned in the bore 54 with the tapered end 53 in the casing pressure passage 31. A smaller bore 56 joins the inner end bore 54 axially thereto and houses a preloaded spring 57 which abuts the tapered end 53 of the poppet 52. When the poppet 52 is moved to fully closed position, the tapered end 53 of the shut-off poppet 52 covers the opening 58 of the bore 56 shutting off the flow therethrough.

A poppet actuating rod 59 extends axially from the other end of the shut-off poppet 52 through a threaded casing plug 60 and is sealed by a ring seal 61 retained in an internal annular groove 62 in the plug 60.

The actuating rods 36 and 47 are pivotally connected, outside the casing 32, to one end of a lever 63. The other end of the lever 63 is adapted to control the actuating rod 59 of the shut-off poppet 52 in response to relative movement of one of the poppets 27 and 41 with respect to the other.

When the shut-off poppet 52 is moved into full shut-off position by lever 63, the fluid under pressure is forced through the clearance provided between the poppet 52 and the bore 54 wall, into the bore chamber 64 behind the poppet 52 and is trapped therein, forcibly locking the shut-off poppet 52 in closed position.

A reset device, in one preferred form, comprises a bleed-off poppet $b$ slidably mounted in a bore $c$ which transversely intersects a bleed-off passage 65 connecting the bore chamber 64 with the casing return passage 45. The bleed-off poppet $b$ has an enlarged tapered disc $d$ at one end, positioned in the bleed-off passage 65 to control the opening $f$, by a compression spring $g$, which abuts the tapered disc $d$ of the poppet $b$ forcing the tapered disc $d$ into the opening $f$ of bore $c$, blocking the passage of fluid therethrough.

The poppet $b$ extends through a threaded casing plug $h$ to the exterior of the casing 32. A ring seal $j$ retained in an internal annular groove $k$ in the plug $h$ prevents external leakage. The outer end $m$ of the bleed-off poppet $b$ can be adapted for manual remote control.

By pushing the bleed-off poppet $b$ inwardly, the tapered disc $d$ of the poppet $b$ moves against the spring $g$ out of the opening $f$ reducing the pressure behind the poppet 52 and allowing the trapped fluid in the bore chamber 64 to pass into the return passage 45 under the influence of the shut-off poppet 52 moving back into open position in response to the force of the system pressure.

The casing pressure and return passages 31 and 45 are connected by pressure and return lines 19 and 21, respectively, to the inlet 68 and return 69 ports of the servo control valve 22 which actuates the hydraulic motor 24. The control valve 22 has a spool 70 relatively movable within a sleeve 71 to control the flow of fluid through the valve 22 to one side or the other of the piston 25 in the hydraulic motor cylinder 26 to actuate the control surface 14. When the valve spool 70 is in the neutral position as shown, the lands 72 of the spool 70 cover a portion only of the flow passage holes 74 in the valve sleeve 71, allowing a balanced leakage of fluid therethrough to preload both sides of the piston 25, as was described earlier in this specification.

The operation of the present invention is now apparent.

The fuse assemblies 73 are preferably placed in the pressure and return line for each power control unit as near as possible to the hydraulic power source in the fuselage of the aircraft 10, and in the present example, at the point in the fuselage where the lines to each power control unit intersect as shown in Figure 1.

Pressure flow from the pump 16 as shown in Figure 2 by way of pressure line 19 enters the casing pressure passage 31 inlet 55 passing through the shut-off poppet bore 54 into the flow rate measuring poppet 27, bore 30, past the tapered end 29 of the poppet 27, which is in open position during normal operation of the system, and out the casing pressure passage outlet 75 into the pressure inlet port 68 of the servo control valve 22. Inasmuch as a certain value of continuous flow is required during substantially all operating conditions of the system, a like quantity of fluid is being continuously returned from the servo valve outlet 69, passing through the return line 21 and entering the casing return passage inlet 76 into the return passage 45 and past the flow rate measuring poppet 41 which is balanced in open position against the spring 42 by the return flow therethrough. The return flow is then directed out the casing return passage outlet 79 to the reservoir 15.

If the pressure line 19 is ruptured between the fuse assembly 73 and the control unit 24, during operation of the system, the supply of fluid to the servo valve 22 will cease, and subsequently the return of fluid from the valve almost immediately ceases causing the preloaded spring 42 to move the poppet 41, now unopposed by flow, into the tapered opening 44 of the return passage 45. Since flow is still existant in the pressure line 19 a differential motion between poppets 27 and 41 will cause the lever 63 to drive the shut-off poppet 52 into the fully closed position.

If the failure occurs in the return line 21, the return passage poppet 41 unopposed by flow is permitted by the force of the spring 42 to move into the return passage 45 causing lever 63, as in the case of the latter example, to close the shut-off poppet 52. In the event that both hydraulic lines are broken, it is at once apparent that the same differential movement between poppets 27 and 41 will, as in the other instances, cause the lever 63 to move the shut-off valve 52 into fully closed position.

For initial starting of the hydraulic system, the reset device is actuated to drain off fluid from chamber 64 behind shut-off poppet 52 which will, under the influence of full system pressure generating from pump 16 and acting against the tapered end 53 of poppet 52 opposite the opening of conduit 31, open conduit 31 to flow therethrough. The preloaded balancing spring 57 also provides a predetermined amount of force to overcome the drag imparted on lever 63 by poppets 27 and 41. However, poppets 27 and 41 will substantially immediately open lines 31 and 45, respectively, and the system is open for normal operation. As stated above, only a rupture of either the pressure line 19 or return line 21 will trigger the fuse 73.

It can thus be seen that the present invention provides a dependable fuse especially suitable for use in continuous flow type hydraulic control systems in aircraft. This fuse is capable of efficient operation under a number of extreme flight conditions, and is simply and conveniently installed in the hydraulic lines at any point intermediate the reservoir and the control unit to provide the maximum range of protection.

Other possible uses of the present invention in hydraulic applications will be readily apparent to those skilled in the art.

While in order to comply with the statute, the invention has been described in language more or less specific as to structural features, it is to be understood that the invention is not limited to the specific features shown, but that the means and construction herein disclosed comprise the preferred form of putting the invention into effect, and the invention is therefore claimed in any of its forms or modifications within the legitimate and valid scope of the appended claims.

What is claimed is:

1. A hydraulic fuse comprising a valve casing having a supply passage therethrough to conduct fluid from a source of fluid under pressure to a motor to be driven thereby, a return passage through said casing to conduct an equal amount of exhausted fluid from said motor to said fluid source, a first valve controlled during all flow rates to move in said supply passage in accordance with the rate of fluid flow therethrough, a second valve controlled during all flow rates to move in said return line in accordance with the rate of fluid flow therethrough, a normally open shut-off valve mounted in said casing supply passage intermediate said fluid source and said first valve, actuating means connecting said first and second flow balanced valves with said shut-off valve, said first valve and second valve being relatively movable with each other only in accordance with a differential in the rate of flow in said supply and return passages to move said shut-off valve from a fluid flow passing position to a fluid flow blocking position, and means for maintaining said shut-off valve in said flow blocking position.

2. In a hydraulic system including a hydraulic motor supplied with operating fluid from a source of fluid under pressure through a supply line and a return line returning exhausted operating fluid from said motor to said source; a hydraulic fuse comprising: a first valve member controlled to move in said supply line at all flow rates in accordance with the rate of fluid flow therethrough, a second valve member controlled to move in said return line at all flow rates in accordance with the rate of fluid flow therethrough, a normally open shut-off valve in said supply line upstream of said first and second valve members, a link connecting said first and second valve members and pivoted to move said shut-off valve into closed position to shut off the flow of fluid through said supply line only when differential movement between said first and second valve members occurs due to a substantial difference in fluid flow rate between said supply and return lines.

3. A hydraulic fuse comprising a valve casing having a supply passage therethrough adapted to conduct fluid from a source of fluid under pressure to a motor to be driven thereby, a return passage through said casing and adapted to conduct an equal amount of exhausted fluid from said motor to said fluid source, means defining a first valve chamber in said supply passage, a first valve member mounted in said valve chamber, means controlling the movement of said member in accordance with the rate of fluid flow through said supply passage, means defining a second valve chamber in said return passage, a second valve mounted to operate in said second valve chamber in accordance with the rate of fluid flow through said return passage, means defining a third valve chamber in said supply passage, a third valve mounted to move in said third valve chamber, said first and second valves being controlled to be maintained in corresponding positions during all flow rates in their respective valve chambers when the rate of fluid flow through said supply and return passages is substantially equal, said first and second valves being operable by fluid flow to move to different positions relative to each other only when the rate of fluid flow through said supply and return passages is different in one from the other, means connecting said first and second valves with said third valve for movement thereof to a flow obstructing position in said supply passage whenever the rate of fluid flow in one of said flow passages is different from the rate of fluid flow in the other said passage.

4. A hydraulic fuse comprising a valve casing having a supply passage therethrough adapted to conduct fluid from a source of fluid under pressure to a motor to be driven thereby, a return passage through said casing and adapted to conduct an equal amount of exhausted fluid from said motor to said fluid source, a first valve chamber intersecting said supply passage, a first valve member elastically controlled to move within said valve chamber in accordance with the rate of fluid flow through said supply passage, a second valve chamber intersecting said return passage, a second valve member elastically controlled to move within said second valve chamber in accordance with the rate of fluid flow through said return passage, a third valve chamber intersecting said supply chamber, a third valve member elastically controlled to move in said third valve chamber from a normally open position, said first and second valve members occupying corresponding positions in their respective passage chambers during all flow rates when a substantially equal rate of fluid flow exists through said supply and return passages, and operable to move to divergent positions in said passage chambers only when the rate of fluid flow in one of said passages is different from the rate of flow in the other said passage, said first and second valve members being connected to move said third valve member to a closed position to block the flow of fluid through said supply passage whenever the rate of fluid flow in one of said flow passages is different from the rate of fluid flow in the other said passage.

5. A hydraulic fuse comprising a valve casing having a supply passage therethrough adapted to conduct fluid from a source of fluid under pressure to a motor to be driven thereby, a return passage through said casing and adapted to conduct an equal amount of exhausted fluid from said motor to said fluid source, said supply passage having a coaxial section of increased diameter to define a valve chamber, a spring loaded valve piston mounted for coaxial movement in said chamber, said return passage having a coaxial section of increased diameter to define a valve chamber, a spring loaded valve piston mounted for coaxial movement in said return passage valve chamber, said valve pistons being maintained in corresponding fluid flow passing positions during all flow rates when the flow rate is equal in said supply and return passages, said valve pistons being movable to diverse positions when the rate of fluid flow is different in one of said passages from the rate of fluid flow in the other said passage, means defining a shut-off valve chamber in said casing supply passage, a normally open shut-off valve piston mounted for coaxial movement in said shut-off valve chamber, said shut-off valve being mechanically connected for movement in accordance with diverse movement of said first and second valve pistons to a flow blocking position in said shut-off valve chamber when the rate of fluid flow between said supply and return passages is unequal.

6. A hydraulic fuse comprising a valve casing having a supply passage therethrough adapted to conduct fluid from a source of fluid under pressure to a motor to be driven thereby, a return passage through said casing and adapted to conduct an equal amount of exhausted fluid from said motor to said fluid source, said supply passage having a coaxial section of increased diameter to define a valve chamber intermediate the casing openings thereof, a valve poppet spring mounted for coaxial movement in said supply passage valve chamber, said return passage having a coaxial section of increased diameter to define a valve chamber intermediate the casing openings thereof, a valve poppet spring mounted for coaxial movement in said return passage valve chamber, said valve poppets occupying corresponding positions during all flow rates in their respective passage chambers when an equal fluid flow rate exists between said supply and return passages, said valves being movable to diverse positions when the rate of fluid flow between said supply and return passages is unequal, means defining a valve chamber in said supply passage intermediate the casing inlet opening thereof and said supply passage valve chamber, a shut-off valve mounted for coaxial movement from a spring flow passing position to a fluid flow blocking position in said supply passage chamber, mechanical linkage interconnecting said supply and return passage control valves to said shut-off valve, said shut-off valve being movable from said spring loaded flow passing position to said fluid flow blocking position in response to movement of said passage valve poppets to said diverse positions when the rate of fluid flow between said supply and return passages is unequal.

7. A hydraulic fuse comprising a valve casing having a supply passage therethrough adapted to conduct fluid from a source of fluid under pressure to a motor to be driven thereby, a return passage through said casing and adapted to conduct an equal amount of exhausted fluid from said motor to said fluid source, said supply and return passages each having a coaxial section of increased diameter to define a valve chamber intermediate the casing openings thereof, the passage opening at one end of each of said valve chambers being flared into said chamber, a tapered valve poppet spring mounted for coaxial movement in each of said chambers within said flared openings from normal corresponding positions during all flow rates in accordance with the rate of fluid flow through said supply and return passages, operating rods extending from said valve poppets for movement therewith, a section of increased diameter in said supply passage adjacent to the casing inlet opening thereof forming a shut-off valve chamber, a shut-off valve spring mounted for coaxial movement in said chamber from a normal position open to fluid flow through said supply passage to a position blocking fluid flow through said supply passage, said shut-off valve being connected for movement to said fluid flow blocking position in said supply passage by said valve poppet operating rods when said valve poppets are moved away from corresponding positions by a differential fluid flow rate occurring between said supply and return passages.

8. A hydraulic fuse comprising a valve casing having a supply passage therethrough adapted to conduct fluid from a source of fluid under pressure to a motor to be driven thereby, a return passage through said casing and adapted to conduct an equal amount of exhausted fluid from said motor to said fluid source, said supply and return passage each having a coaxial section of increased diameter to define a valve chamber intermedaite casing inlet and outlet openings thereof, the passage opening at one end of each of said chambers being flared into said chamber, a tapered valve poppet spring mounted for coaxial movement in each of said chambers within said flared openings from normally corresponding positions during all flow rates through said supply and return passages, an operating rod extending from the end of each valve poppet opposite the tapered end thereof through sealed casing apertures to the exterior of said casing, said operating rods being movable with said poppets, a coaxial shut-off valve chamber in said supply passage adjacent the casing inlet opening thereof, a shut-off valve spring mounted for movement in said chamber from a normal spring loaded fluid passing position to a fluid flow blocking position to shut off the flow of fluid through said supply passage, an operating rod extending from said shut-off valve through a sealed casing aperture to the exterior of said casing, a lever member connected to said operating rods of said valve poppets and engageable with said shut-off valve operating rod to move said shut-off valve against said spring into said flow blocking position in response to movement of said valve poppets from normal corresponding positions when the rate of fluid flow in one of said passages is unequal to the rate of fluid flow in the other said passage.

References Cited in the file of this patent
UNITED STATES PATENTS

| | | |
|---|---|---|
| 1,476,739 | Torngren | Dec. 11, 1923 |
| 2,378,211 | Spraque et al. | Aug. 9, 1949 |
| 2,508,399 | Kendrick | May 23, 1950 |
| 2,574,416 | Rose | Nov. 6, 1951 |